Jan. 10, 1928.

C. S. JOHNSON 1,656,002

METHOD FOR PROPORTIONING TOTAL WATER IN CONCRETE

Filed April 29, 1926

Inventor:
Charles S. Johnson
By Crundall Parker Carlson
Attys.

Patented Jan. 10, 1928.

1,656,002

UNITED STATES PATENT OFFICE.

CHARLES S. JOHNSON, OF CHAMPAIGN, ILLINOIS.

METHOD FOR PROPORTIONING TOTAL WATER IN CONCRETE.

Application filed April 29, 1926. Serial No. 105,614.

The invention relates generally to the art of making concrete and more particularly to an improved method for accurately proportioning the amount of total water in the mix independently of the amount of moisture normally contained in the aggregates.

It has been recognized that the strength of concrete depends largely upon the total amount of water in the mix and that the strength varies as the amount of water varies from that required for the chemical reactions with the cement. If the amount of water is just sufficient fully to react with the cement, the resulting mix gives the maximum strength, but the mix is too stiff for most practical purposes. With a lesser amount of water the strength of the concrete decreases rapidly in proportion to the amount of water while with an excess of water the strength of the concrete also decreases rapidly with increasing quantities of water so that with 100% excess water the strength of the concrete is about 20% of the maximum obtainable with no excess water. It follows that the accurate determination of the quantity of water included in the mix is highly essential to obtain concrete of uniform and predetermined strength.

It is the object of the invention to provide an improved process for obtaining the accurate control of the total water weight in a concrete mix independently of the normal moisture content of the aggregates.

In the processes heretofore used for proportioning the aggregates and water for concrete mixtures by weight satisfactory accuracy has not been obtained because of the variable normal moisture content in commercial building sand and gravel. Unknown increases in moisture content have caused unknown decreases in dry aggregate content due to bulking, and vice versa. When introduced into a concrete mix with separately proportioned units of water, these unknown variations in normal moisture content of the aggregates have caused unknown variations in the total water in the mix.

In the processes wherein the proportioning has been done by volumetric measurements of the gravel and water, inaccuracies have resulted due to the variations in compaction in such commercial building materials. Unknown changes in compaction result from unknown changes in moisture content. Thus, when the aggregates and water have been measured separately by volume, variable quantities of normally moist total water have been introduced into the mix. These variations in total water content in concrete mixtures change the consistency of the mixed concrete, increase the placing expense due to changes in workability, cause changes in the strength of the concrete, all other factors being held constant, and may cause "honey combed" concrete.

Numerous attempts have been made to control more accurately the amount of water introduced into the mix but no process has been advanced whereby the total moisture could be predetermined satisfactorily without frequent adjustment to compensate for apparent variations in the normal moisture content or the compaction of the aggregates. Loose dry aggregates are subject to density changes or changes in compaction by jarring or tamping, these changes depending in part upon the gradation. Moist aggregates are also subject to such changes of density or compaction. If the aggregate be submerged it is still subject to density changes or changes in compaction when jarred or tamped or allowed to stand undisturbed, these changes again depending in part upon the gradation. Thus these prior processes wherein the quantity of normally moist aggregate has been measured by volume have been unsatisfactory in that they do not provide an accurate means to determine the total quantity of water in the mix. This error has been due largely to the fact that the gradation and apparent voids of commercial aggregates vary, and that the density changes with tamping.

The specific gravity of commercial aggregates, however, is a quality that cannot be altered by handling, jarring, tamping, gradation or standing undisturbed, and tests have shown that commercial building sand and gravel coming from many separated sources are remarkably uniform in their specific gravity. I therefore utilize this quality of the aggregates and provide a process for proportioning the water in concrete mixtures in accordance with the specific gravity of the aggregates, the process consisting generally in combining water with the one aggregate until the total weight of the water and that aggregate equals a predetermined amount at a predetermined volume.

For the purpose of illustrating more clearly the operation of my invention I have illustrated an apparatus adapted to utilize the process, but it is to be understood that the form of the apparatus used may be varied at will without departing from the spirit and scope of the invention as expressed in the claims.

For purposes of simplicity I shall hereinafter refer to aggregates as sand though it is to be understood that in doing so I contemplate coarser aggregates as well.

Figure 1:
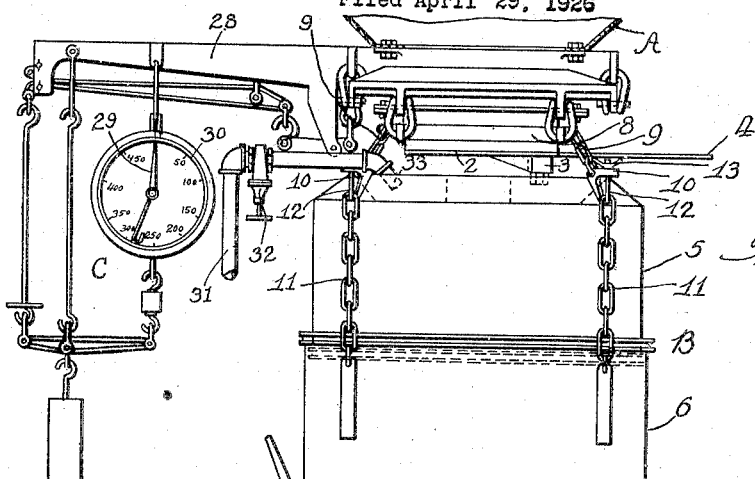
Figure 1 is an elevational view, somewhat diagrammatic in nature, of an apparatus adapted to the invention.

Referring to the drawings, the apparatus illustrated comprises a sand bin A, an adjustable measuring hopper B and a weighing mechanism having a dial C. The sand bin may be supported by any suitable means (not shown) and the hopper and weighing device are herein shown as suspended from the bin. The bin has a circular discharge opening 1 at the bottom thereof, controlled by a gate 2 which is pivotally mounted on the bin at 3. This gate is operable by means of a handle 4.

The measuring hopper comprises telescoping cylindrical sections 5 and 6 slidable one within the other to permit volumetric adjustment thereof. As illustrated herein the upper section 5 has an overflow spout 7 and is supported from a member 8 of the weighing device by means of a plurality of chains 9 fastened to the member 8 and to brackets 10 secured on the hopper. The lower section 6 is suspended from the upper section by means of a plurality of chains 11 which are anchored at their lower ends on the lower section. At their upper ends these chains are looped over hooked portions 12 of adjustable screw threaded devices 13 carried on the brackets 10, it being apparent that the volume of the hopper may thereby be adjusted by manipulating the screw devices 13 or by looping another link of the chains 11 over the hooks 12.

The lower section 6 is preferably provided with converging sides 14 which define a discharge port 15 at the bottom of the hopper. This port is controlled by a gate 16 which is provided with a water tight gasket 17. As illustrated herein the gate is carried on an arm 18 which is pivotally supported intermediate its ends at 19 on a bracket 20 secured rigidly to the section 6 of the hopper. The end 21 of the arm is pivoted to an outstanding lug 22 on the gate. To operate the gate a hand lever 23 is pivoted at 24 on the bracket 20, and a toggle link 25 is connected intermediate the adjacent ends of the lever 23 and arm 18 so that in the closed position of the gate as illustrated in the drawings, the gate is held locked by the toggle device.

The weighing mechanism may be of any preferred form, that illustrated in the drawings comprising the scale member 8 supported from an arm 28 by means of any well known character and connected with an indicating pointer 29 on the dial C through suitable linkage. This mechanism is adjusted so that with the hopper empty the pointer 29 indicates zero on a scale 30 on the dial C, which scale is calibrated in pounds.

A pipe 31 is adapted to be connected to a suitable water supply (not shown) and has therein a valve 32 adapted to control the discharge of water from an outlet 33 into the hopper.

The process when utilized in connection with this apparatus consists generally in placing a known quantity of water in the hopper of a predetermined volume and then filling the hopper with normally moist sand until the combined weight of the sand and water equals a predetermined amount.

Assuming, for purposes of illustration, that it is desired to proportion the ingredients for a concrete mix which will contain 70 pounds of water, 200 pounds of sand, 100 pounds of cement and 400 pounds of stone. As this process is applicable primarily to the proportioning of the water and sand we shall consider only these two ingredients, the others being proportioned by any convenient method. A simple method for calibrating the hopper to the proper volume for these quantities of water and sand is as follows:

The specific gravity of the sand is first determined by the customary process of dividing the weight of a dry sample weighed in air by the loss in weight of the same sample weighed suspended in water. For this example we shall consider this as 2.5. As the specific gravity of a substance expresses the relation of the weight of a given volume of the substance to the weight of the same volume of water, the weight of the sand is 2.5 times the weight of the same volume of water. Therefore by dividing the weight of the sand (200 pounds) by 2.5 the result is 80 which is the weight of a quantity of water equal in volume to the absolute volume of 200 pounds of sand. Therefore, by running 80 pounds of water into the hopper as an equivalent to the volume of 200 pounds of dry sand, and then adding 70 pounds as the amount selected for the total water for the mix, the hopper may be set to this combined volume by adjustment so that the top surface of the water is level with the overflow. The hopper is thereby set volumetrically for the proportioning of a pound unit of water and a 200 pound unit of dry sand.

Figures 2, 3:
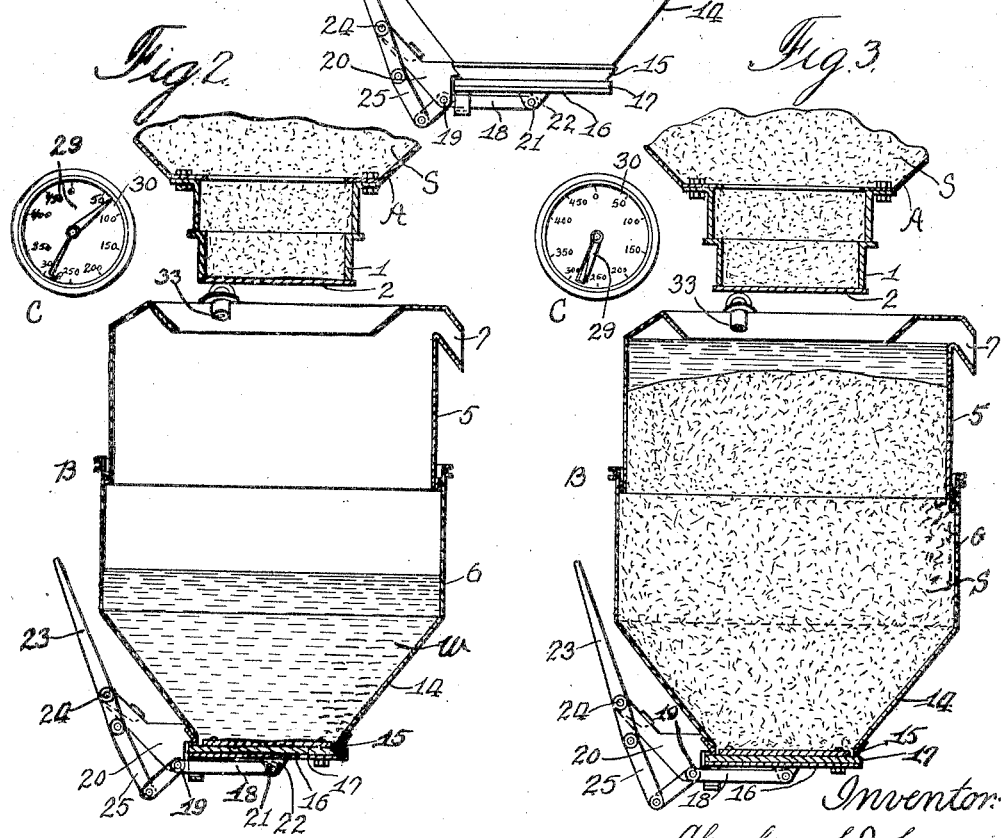
Figs. 2 and 3 are diagrammatic views illustrating two different stages in the process.

The operation of the apparatus in utilizing my invention is then as follows: Water is run into the hopper from the pipe line until 70 pounds, the total weight of water desired in the mix, is contained therein (Fig. 2). This amount should be sufficient to submerge the sand to be added. Then sand of any degree of moisture content is discharged from the bin A into the hopper until the weight of the combined sand and water equals 70 plus 200 or 270 pounds (Fig. 3). In this way any water which is introduced as moisture in the sand will displace an equal weight of the water initially placed in the hopper, this displaced quantity of water passing out through the overflow spout.

It will be evident that the hopper will now contain 70 pounds of water and 200 pounds of dry-sand-content independently of the degree of compaction of the sand provided only that the mass of sand in the hopper is not great enough to absorb more than 70 pounds of water. In practice this does not occur as the water required for workable concrete mixtures is greater than that which will fill the voids in the sand.

This process is readily adapted for practical operation and lends itself easily to changes in the proportion of the ingredients when such change is desired. Thus, if it is desired to keep the water-cement ratio constant, as is now well recognized as a means to obtain concrete of uniform strength, and yet vary the amounts of sand and stone in the mix, this dry-sand-content weight may be varied without changing the total water, merely by increasing or decreasing the volume of the hopper and also the scale reading of the weighing mechanism.

Although it is preferable first to insert the desired amount of water in the hopper, it is sufficient if at least the total amount desired less the moisture contained in the sand, be filled in the hopper. In practice the quantity run in is usually equal to or greater than 70 pounds, it being obvious that any excess will run off as it is displaced by the dry-sand-content of the sand discharged into it.

From the foregoing it will be apparent that by combining water, which is of constant specific gravity for practical purposes and therefore of uniform weight per unit volume, with sand which is also of practically constant specific gravity and therefore of uniform weight per unit volume, into resultant masses of equal weights and equal volumes, the proportions of total water and dry-sand-content in these resultant masses must necessarily be constant. Thus the process is adapted to control accurately the total water in the mix independently of the normal moisture content of the sand, and thereby assures uniformity in the strength of the concrete.

I claim as my invention:

1. The process of proportioning water and aggregates for concrete which includes combining an aggregate containing a variable moisture content with water until the sum of their weights at a given combined volume equals a predetermined amount.

2. The method of proportioning water and aggregates for a concrete mix which includes combining an aggregate having a variable moisture content with water until the sum of their weights equals a predetermined amount and permitting water to flow off when the combined volume equals a predetermined maximum.

3. The process for proportioning water and aggregates for concrete which includes running substantially a predetermined quantity of water into a container of predetermined volume and discharging a normally moist aggregate into the container to a predetermined total weight of aggregate and total water at said predetermined volume.

4. The process for proportioning water and aggregates for concrete which includes running a quantity of water into a container of predetermined volume and then discharging normally moist aggregate of known specific gravity into the container so that the moisture in the sand combines with the water in the container until the weight of the combined aggregate and total water equals a predetermined value at a predetermined total volume.

In testimony whereof, I have hereunto affixed my signature.

CHARLES S. JOHNSON.

CERTIFICATE OF CORRECTION

Patent No. 1,656,002.             Granted January 10, 1928, to

CHARLES S. JOHNSON.

It is hereby certified that error appears in the printed specification of the above numbered patent requiring correction as follows: Page 1, line 50, before the word "gravel" insert the word "sand", and line 57, strike out the words "normally moist"; page 2, line 102, for the word "volume" read "volumes", and line 129, before the word "pound" first occurrence insert the numeral "70"; and that the said Letters Patent should be read with these corrections therein that the same may conform to the record of the case in the Patent Office.

Signed and sealed this 14th day of February, A. D. 1928.

Seal.                                                      M. J. Moore,
                                                      Acting Commissioner of Patents.